(12) United States Patent
Fuchs

(10) Patent No.: US 6,741,062 B2
(45) Date of Patent: May 25, 2004

(54) CIRCUIT CONFIGURATION FOR SUPPLYING AN ELECTRIC MOTOR

(75) Inventor: Elmar Fuchs, Bregenz (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/368,788

(22) Filed: Feb. 19, 2003

(65) Prior Publication Data

US 2003/0169016 A1 Sep. 11, 2003

(30) Foreign Application Priority Data

Mar. 7, 2002 (AT) .......................... A 360/2002

(51) Int. Cl.[7] .................. H02P 5/24; H02P 3/18
(52) U.S. Cl. ............. 318/800; 318/801; 318/757; 318/362
(58) Field of Search ................. 318/800, 801, 318/5, 7, 60, 139, 3, 4, 757, 273, 362–382

(56) References Cited

U.S. PATENT DOCUMENTS

| | | | | |
|---|---|---|---|---|
| 3,909,685 A | * | 9/1975 | Baker et al. ............... | 318/139 |
| 5,589,743 A | * | 12/1996 | King ........................ | 318/139 |
| 6,429,554 B1 | * | 8/2002 | Albrich et al. ............ | 310/68 R |
| 6,435,311 B2 | * | 8/2002 | Araki et al. ............... | 187/290 |
| 6,435,312 B2 | * | 8/2002 | Tajima et al. .............. | 187/290 |
| 6,474,447 B2 | * | 11/2002 | Tajima et al. .............. | 187/290 |
| 2003/0128001 A1 | * | 7/2003 | Pabst et al. ................. | 318/105 |

\* cited by examiner

*Primary Examiner*—Rina Duda
*Assistant Examiner*—Patrick Miller
(74) *Attorney, Agent, or Firm*—Laurence A. Greenberg; Werner H. Stemer; Ralph E. Locher

(57) ABSTRACT

A circuit configuration supplies an electric motor with a stator and a rotor. The stator has a large number of electromagnets, arranged in particular in the form of a ring, and the rotor has a large number of permanent magnets that are associated with the electromagnets on the stator and are arranged, in particular, in the form of a ring. A rectifier circuit converts the a.c. voltage which is drawn from the supply network to a d.c. voltage. A converter circuit converts the d.c. voltage to a controllable frequency a.c. voltage for supplying the electric motor with electrical drive energy. An energy storage circuit which contains at least one accumulator is connected between the rectifier circuit and the converter circuit.

6 Claims, 3 Drawing Sheets

CIRCUIT CONFIGURATION FOR SUPPLYING AN ELECTRIC MOTOR

BACKGROUND OF THE INVENTION

Field of the Invention

The invention relates to a circuit configuration for supplying an electric motor which has a stator (arranged in a fixed position) and a moving rotor which is mounted, in particular, such that it can rotate. The stator has a large number of electromagnets which are arranged annularly and the rotor has a large number of permanent magnets which are associated with the electromagnets on the stator and are arranged, in particular in the form of a ring. A rectifier circuit provides for the conversion of the a.c. voltage which is drawn from the supply network to a d.c. voltage, and a converter circuit provides for the conversion of the d.c. voltage to a controllable frequency a.c. voltage which is used for supplying the electric motor.

Prior art circuit configurations of this type comprise a rectifier circuit which is used to convert the a.c. voltage, in particular a three-phase a.c. voltage, which is drawn from the supply network to a d.c. voltage. The rectifier circuit is connected to a converter circuit which produces an a.c. voltage which is used as the supply voltage for the electric motor. The drive control for the electric motor is provided by controlling the frequency and amplitude of the a.c. voltage which is produced from the d.c. voltage. A circuit part which contains capacitors and which provides the required smoothing for the d.c. voltage is located between the rectifier circuit and the converter circuit.

The a.c. voltage which is produced from the d.c. voltage supplies the electromagnets on the stator to attract or repel the permanent magnets which are arranged on the rotor, thus moving the rotor.

If the electromagnets are arranged in groups which in each case act on their own, the operation of the electric motor is ensured even if individual electromagnets fail.

A circuit configuration such as this does not always comply with the requirements placed on it since, if the supply voltage fails, the power which is required to operate the drive motor fails immediately, so that the system comes to rest abruptly. However, since it is absolutely essential in a large number of systems for the movement to cease smoothly—such systems including, for example, cable car systems and similar driven systems—there is a requirement to provide a flywheel mass, whose kinetic energy allows the system to come to rest slowly.

SUMMARY OF THE INVENTION

It is accordingly an object of the invention to provide a circuit configuration for supplying an electric motor which overcomes the above-mentioned disadvantages of the heretofore-known devices and methods of this general type and which supplies a drive motor and ensures that the movement stops smoothly even when no flywheel mass is provided.

With the foregoing and other objects in view there is provided, in accordance with the invention, a circuit configuration for supplying an electric motor, comprising:

a rectifier circuit for receiving an a.c. voltage from a supply network and for converting the a.c. voltage to a d.c. voltage;

a converter circuit for converting the d.c. voltage to a controllable-frequency a.c. voltage for driving the electric motor; and an energy storage circuit containing an accumulator connected between the rectifier circuit and the converter circuit.

In accordance with an added feature of the invention, the accumulator comprises at least one rechargeable battery or a bank of series-connected rechargeable batteries. In a preferred embodiment, the energy storage circuit includes one or more capacitors connected in parallel with the accumulator.

In accordance with another feature of the invention, the stator of the electric motor has a plurality of groups of electromagnets, and the converter circuit is one of a plurality of converter circuits each associated with a respective one of the plurality of electromagnets, and the energy storage circuit is one of a plurality of energy storage circuits each associated with a respective one of the plurality of electromagnets.

With the above and other objects in view there is also provided, in accordance with the invention, an electric motor drive assembly, comprising:

an electric motor having a stator with a plurality of annularly disposed electromagnets and a rotor with a plurality of annularly disposed permanent magnets associated with the electromagnets of the stator;

a rectifier circuit for receiving an a.c. voltage from a supply network and for converting the a.c. voltage to a d.c. voltage;

a converter circuit connected to the electric motor, the converter circuit being configured to convert the d.c. voltage to a controllable-frequency a.c. voltage for driving the electric motor; and an energy storage circuit containing an accumulator connected between the rectifier circuit and the converter circuit.

In other words, the objects of the invention are achieved by providing at least one energy storage circuit, which contains a rechargeable electrical device, between the rectifier circuit and the converter circuit.

The energy storage circuit preferably has at least one group of series-connected rechargeable batteries. In this case, the energy storage circuit may also, in a manner known per se, contain at least one capacitor, which is connected in parallel with the at least one rechargeable battery. According to a further preferred embodiment, the stator of the electric motor has a number of groups of electromagnets, which each have their own associated energy storage circuits and converter circuits.

Other features which are considered as characteristic for the invention are set forth in the appended claims.

Although the invention is illustrated and described herein as embodied in a circuit configuration for supplying an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
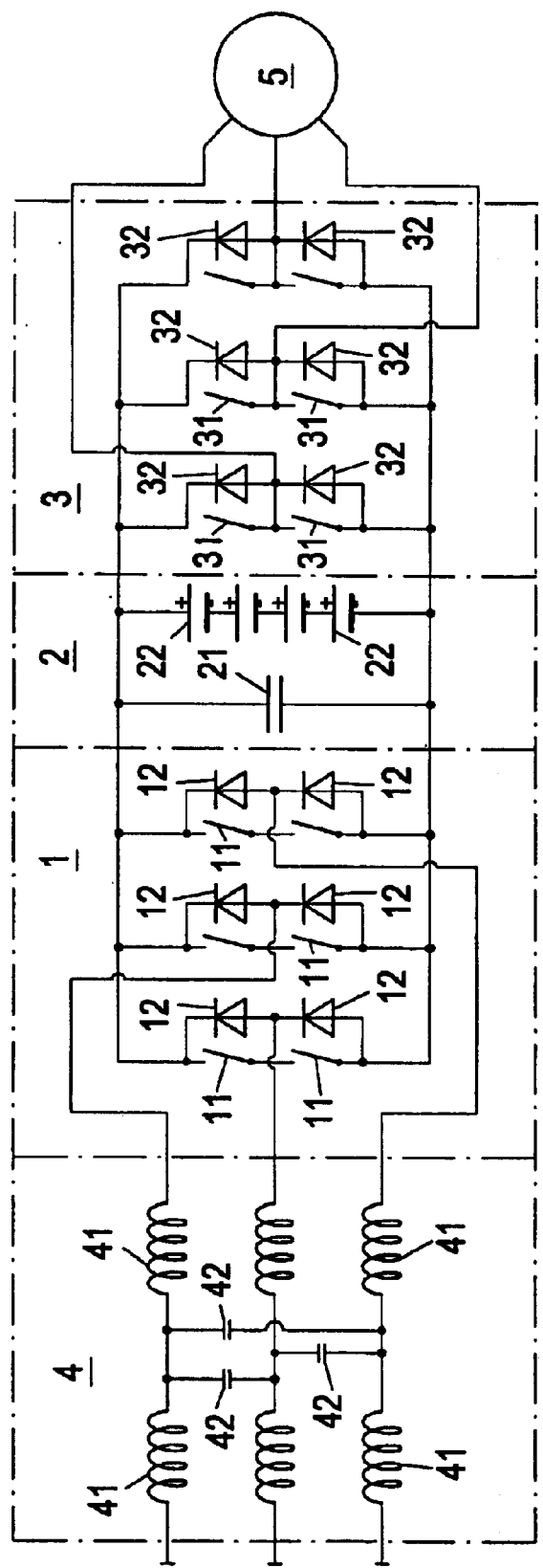
FIG. 1 is a schematic circuit diagram illustrating a circuit configuration according to the invention.

Referring now to the figures of the drawing in detail and first, particularly, to FIG. 1 thereof, there is shown a circuit configuration according to the invention that contains a rectifier circuit 1, an energy storage circuit 2, a converter circuit 3, and a filter circuit 4. The rectifier circuit 1 is connected to a three-phase supply network via the filter circuit 4, which contains inductors 41 and capacitors 42. The rectifier circuit 1, which contains a number of electronic switches 11 and diodes 12, converts the a.c. voltage to a d.c. voltage. The filter circuit 4 is used to prevent disturbances caused by the rectifier circuit 1 from reaching the supply network.

The energy storage circuit 2 contains a number of series-connected accumulators, such as rechargeable batteries 22, and at least one capacitor 21. The energy storage circuit 2 thus stores energy in the form of a d.c. voltage.

The converter circuit 3 likewise contains a number of electronic switches 31 and diodes 32 and is used to produce an a.c. voltage for supplying a drive motor 5. The movement control for the drive motor 5 is provided by controlling the amplitude and the frequency of the a.c. voltage generated in the converter circuit 3.

If the supply network fails, the converter circuit 3 is supplied with the electrical energy that is stored in the rechargeable batteries 21. This ensures the necessary further movement of the drive motor 5 in order to prevent the system that is driven by it, for example a cable car system, from stopping abruptly. In fact, the system is brought to rest at a decreasing rate.

Figure 2:
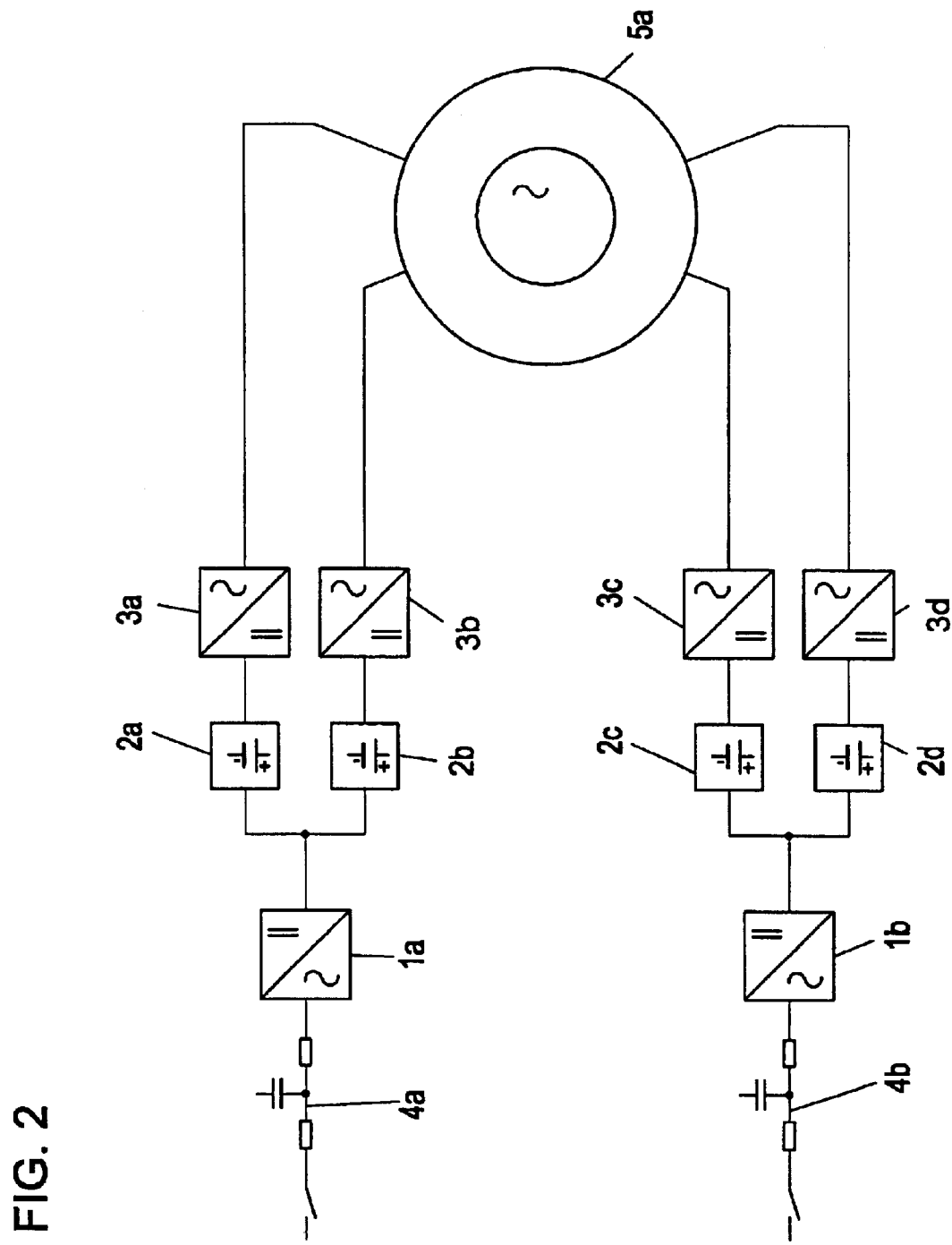
FIG. 2 is a block diagram of the circuit configuration according to the invention with a first embodiment of an electric motor supplied by the circuit configuration.

FIG. 2 shows a circuit configuration for a drive motor 5*a* which has four groups of electomagnets. This configuration comprises two rectifier circuits 1*a* and 1*b*, which are connected to the supply network via network filters 4*a* and 4*b*. Two energy storage circuits 2*a*, 2*b*, 2*c* and 2*d* and two converter circuits 3*a*, 3*b*, 3*c* and 3*d* are in each case connected to the rectifier circuits 1*a* and 1*b*. The converters 3*a* to 3*d* supply four groups of electromagnets which are arranged on the stator of the electric motor 5.

Figure 3:
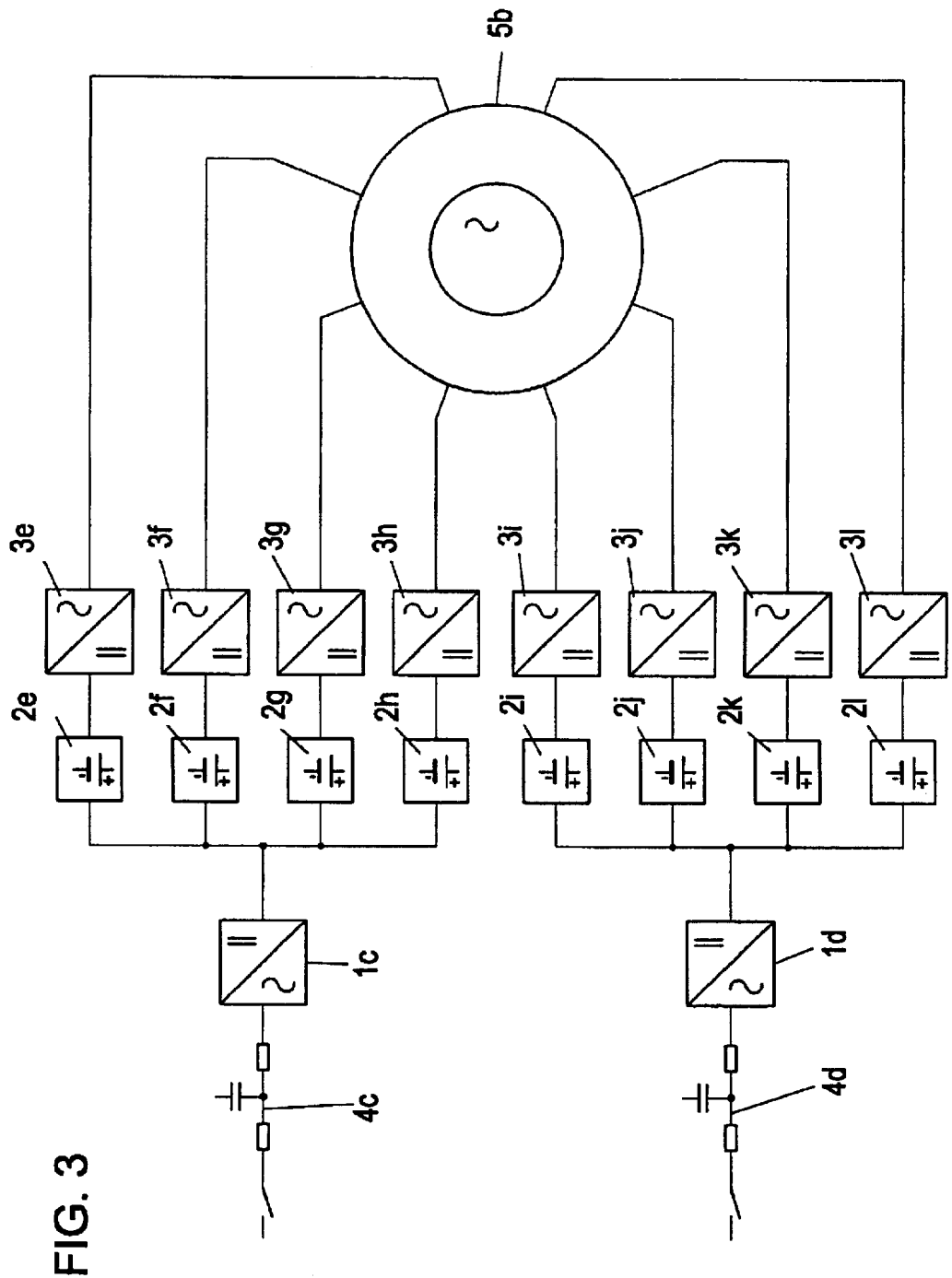
FIG. 3 is a block diagram of the circuit configuration according to the invention with a second embodiment of an electric motor supplied by the circuit configuration according to the invention.

FIG. 3 shows a circuit configuration for controlling an electric motor 5*b* which has eight groups of electromagnets which can each be fed with controlled-frequency a.c. voltage independently of one another via the filter circuits 4*c*, 4*d*, the rectifier circuits 1*c*, 1*d*, the energy storage circuits 2*e* to 2*l* and the converter circuits 3*e* to 3*l*.

As noted in the introductory text, designing the electric motor to have groups of electromagnets which are supplied separately from one another ensures the operation of the drive motor even if individual drive groups fail.

I claim:

1. In a cable car system having an electric motor driving the cable car system, the electric motor having a stator with a plurality of groups of electromagnets, a circuit configuration for supplying the electric motor, comprising:

a rectifier circuit for receiving an a.c. voltage from a supply network and for converting the a.c. voltage to a d.c. voltage;

a plurality of converter circuits each associated with a respective one of the plurality of electromagnets for converting the d.c. voltage to a controllable-frequency a.c. voltage for driving the electric motor; and a plurality of energy storage circuits each associated with a respective one of the plurality of electromagnets and containing an accumulator connected between said rectifier circuit and a respective said converter circuit for modeling a flywheel mass for assuring that movement of the cable car system stops smoothly upon a cessation of the a.c. voltage from the supply network.

2. The circuit configuration according to claim 1, wherein said accumulator comprises at least one rechargeable battery.

3. The circuit configuration according to claim 1, wherein said accumulator of said energy storage circuits comprise a group of series-connected rechargeable batteries.

4. The circuit configuration according to claim 1, wherein said energy storage circuit comprises at least one capacitor connected in parallel with said accumulator.

5. An electric motor drive assembly, comprising:

an electric motor having a stator with a plurality of annularly disposed electromagnets and a rotor with a plurality of annularly disposed permanent magnets associated with said electromagnets of said stator;

a rectifier circuit for receiving an a.c. voltage from a supply network and for converting the a.c. voltage to a d.c. voltage;

a converter circuit connected to said electric motor, said converter circuit being configured to convert the d.c. voltage to a controllable-frequency a.c. voltage for driving said electric motor; and an energy storage circuit containing an accumulator connected between said rectifier circuit and said converter circuit for modeling a flywheel mass assuring that a movement of the electric motor stops smoothly upon a cessation of the a.c. voltage from the supply network.

6. The assembly, according to claim 5, wherein said stator of said electric motor has a plurality of groups of electromagnets, and said converter circuit is one of a plurality of converter circuits each connected with a respective one of said groups of electromagnets, and said energy storage circuit is one of a plurality of energy storage circuits each associated with a respective one of said groups of electromagnets.

* * * * *